United States Patent Office 3,203,952
Patented Aug. 31, 1965

---

3,203,952
CHLOROMETHYLSULFONAMIDES OF CYCLIC DIAMINES
Leo A. Paquette, Portage Township, Kalamazoo County, Mich., assignor to The Upjohn Company, Kalamazoo, Mich., a corporation of Delaware
No Drawing. Filed Dec. 4, 1962, Ser. No. 242,073
10 Claims. (Cl. 260—239)

This invention relates to novel compositions of matter and to a process for their preparation and is particularly directed to chloromethylsulfonamides of cyclic diamines and to their preparation.

The novel compounds of the invention have the following formula:

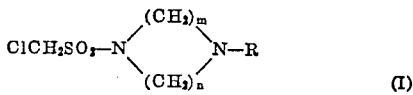
(I)

wherein $m$ and $n$ are 2 or 3 and R is a saturated hydrocarbon radical of not more than 10 carbon atoms, for example, alkyl, cycloalkyl, aralkyl, and aryl. They have analgesic activity and are useful in producing analgesia in mammals, poultry, and like animals when administered orally or parenterally. They also have antifungal activity and can be used as an industrial or agricultural fungicide.

The novel compounds of the invention are nitrogenous bases and as such can exist in both the protonated and nonprotonated form according to the pH of the environment. The nonprotonated form can be oxidized, with hydrogen peroxide for example, to form the N-oxide. The N-oxide also can exist in both the protonated and nonprotonated form according to the pH of the environment. The protonated forms can be isolated as acid addition salts which are useful for upgrading the free base and free base N-oxide forms, i.e., the nonprotonated forms. Suitable acids for this purpose include hydrochloric acid, sulfuric acid, phosphoric acid, acetic acid, succinic acid, salicylic acid, maleic acid, thiocyanic acid, fluosilicic acid, picric acid, Reinecke's acid, azobenzenesulfonic acid, and the like. The acid addition salt can be formed by neutralizing the free base or N-oxide free base with the appropriate acid or by metathesis.

The novel chloromethylsulfonamides (Formula I) are useful intermediates. Thus the condensation products obtained from the thiocyanic acid addition salts and formaldehyde according to U.S. Patents 2,424,320 and 2,606,-144 are useful as pickling inhibitors, and the fluosilicic acid addition salts are useful as mothproofing agents according to U.S. Patents 1,915,334 and 2,075,359.

The novel compounds of the invention can also exist in the form of quaternary ammonium salts, such for example, as those obtained by coordinating the free base form with an alkyl halide, for example, methyl, ethyl, propyl, butyl, pentyl, hexyl, heptyl, octyl, decyl, dodecyl, tetradecyl, and octadecyl chlorides, bromides, and iodides, including the isomers thereof. The quaternary ammonium salts are useful for forming the corresponding quaternary ammonium salts of fluosilicic acid which are useful as mothproofing agents. These fluosilicic acid salts can be formed by metathesis with an inorganic fluosilicate or by forming the quaternary ammonium hydroxide (by treating the salt with an equivalent of base, e.g., sodium hydroxide) and neutralizing it with fluosilicic acid. The higher alkyl quaternary ammonium salts, i.e., those containing from 8 to 18 carbon atoms, inclusive, in the alkyl group, are useful as cationic surface active agents and disinfectants.

The novel compounds of the invention are prepared by reacting chloromethanesulfonyl chloride with a cyclic diamine of the formula:

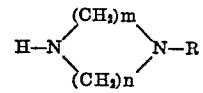

wherein $m$ and $n$ are 2 or 3 and R is a saturated hydrocarbon radical of not more than 10 carbon atoms. R for example, can be alkyl, such as methyl, ethyl, propyl, butyl, pentyl, hexyl, heptyl, octyl, nonyl, and decyl, and the isomeric forms thereof; cycloalkyl, such as cyclopropyl, cyclobutyl, cyclopentyl, cyclohexyl, 2-methylcyclohexyl, cycloheptyl, cyclooctyl, cyclononyl, cyclodecyl, bornyl, fenchyl, cyclopentylpropyl, and the like; aralkyl such as benzyl, phenethyl, 3-phenylpropyl, 4-phenylbutyl, α-methylbenzyl, α-ethylbenzyl, p-isopropylbenzyl, and the like; aryl, such as phenyl, tolyl (o-, m-, and p-), xylyl (all isomers), isopropylphenyl (o-, m-, and p-), 1- and 2-naphthyl, and the like.

The reaction advantageously is carried out in the presence of an inert solvent and an acid binding agent for reaction with the hydrogen chloride liberated during the reaction. An excess of the cyclic diamine can be used as the acid binding agent; alternatively there can be used for this purpose an inorganic base such as sodium hydroxide or a tertiary amine such as triethylamine or N-methylpiperidine. Advantageously the inert solvent is an aprotic solvent, for example, a chlorinated hydrocarbon solvent, such as chloroform, methylene chloride, dichloroethane, and chlorobenzene. Hydroxylic solvents, e.g., water, methanol and like alkanols and acetic acid and like acids, can be used but are less desirable because of the difficulty of isolating the product from the reaction mixture. The temperature can vary from about 0° C. (with longer reaction times) to the boiling point of the solvent, but is preferably maintained between about 20° and about 100° C. Cooling of the reaction mixture initially may be desirable to avoid excessive heating.

The invention may be more fully understood by reference to the following examples.

GENERAL PROCEDURE

Equimolar quantities of chloromethanesulfonyl chloride and cyclic diamine were used. To a stirred chloroform solution of the diamine (0.10 mole per 100 ml. of chloroform) was added dropwise a chloroform solution of chloromethane-sulfonyl chloride (0.10 mole of chloromethanesulfonyl chloride per 50 ml. of chloroform) with intermittent cooling to keep the temperature at 30–40° C. When the addition was completed, the mixture was refluxed with stirring for 1–2 hours. The chloroform was removed by distillation at reduced pressure or by decantation, and the residue was crystallized from a suitable solvent or solvent system.

*Example 1.—1-(chloromethylsulfonyl)-4-methylpiperazine hydrochloride*

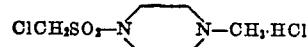

From 10.0 g. (0.10 mole) of N-methylpiperazine and 14.9 g. (0.10 mole) of chloromethanesulfonyl chloride there was obtained, after evaporation of the chloroform, a pale yellow gummy solid. Crystallization of this material from methanol-ether gave 15.5 g. (62.3 percent) of product, M.P. 182–190° C. (dec.). Four recrystallizations of this material from methanol gave pure 1-(chloromethylsulfonyl)-4-methyl-piperazine hydrochloride as white stars, M.P. 205° C. (dec.).

*Analysis.*—Calcd. for $C_6H_{14}Cl_2N_2O_2S$: C, 28.92; H, 5.66; Cl, 28.46. Found: C, 29.14; H, 5.69; Cl, 28.76.

*Example 2.—1-(chloromethylsulfonyl)hexahydro-4-mehyl-1,4-diazepine hydrochloride*

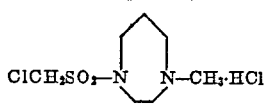

From 11.4 g. (0.10 mole) of N-methylhomopiperazine and 14.9 g. (0.10 mole) of chloromethanesulfonyl chloride there was obtained, after decantation of the chloroform, a gummy, pale orange solid. Crystallization of this material from methanol afforded 17.6 g. (67.0 percent) of pale yellow crystals, M.P. 172–175° C. Two recrystallizations of this material from methanol-ether gave pure 1-(chloromethylsulfonyl)hexahydro-4-mehyl-1,4-diazepine hydrochloride as white stars, M.P. 178–180° C.

*Analysis.*—Calcd. $C_7H_{16}Cl_2N_2O_2S$: C, 31.94; H, 6.13; Cl, 26.94. Found: C, 31.91; H, 6.11; Cl, 27.17.

*Example 3.—1-(chloromethylsulfonyl)octahydro-5-methyl-1,5-diazocine hydrochloride*

From 9.3 g. (0.0726 mole) of 1-methyl-1,5-diazacyclooctane and 10.8 g. (0.0726 mole) of chloromethanesulfonyl chloride there was obtained, after evaporation of the chloroform, a colorless gum. Crystallization of this material from isopropanol gave 15.6 g. (77.6 percent) of white solid. Three recrystallizations of this material from aqueous isopropanol gave pure 1-(chloromethylsulfonyl)octahydro-5-methyl-1,5-diazocine hydrochloride as an amorphous white solid, M.P. 207–209° C. (dec.).

*Analysis.*—Calcd. for $C_8H_{18}Cl_2N_2O_2S$: C, 34.65; H, 6.54; N, 10.11. Found: C, 34.32; H, 6.65; N, 9.65.

The free bases corresponding to the above examples are obtained by neutralization of the hydrochlorides with a strong base, such as sodium hydroxide or a quaternary ammonium base exchange resin, or by metathesis with silver carbonate. The N-oxides are formed by oxidizing the free bases with a peroxide, for example, hydrogen peroxide.

By substituting the N-methyl cyclic diamines of the examples by the corresponding N–R cyclic diamines where R is any of the saturated hydrocarbon radicals exemplified above, there are obtained the corresponding chloromethylsulfonamides.

I claim:
1. A member of the group consisting of a compound of the formula:

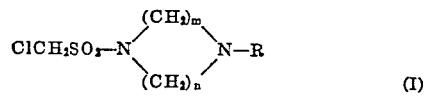

wherein $m$ and $n$ are integers of from 2 to 3 and R is hydrocarbon free of olefinic and acetylenic unsaturation of not more than 10 carbon atoms and the acid addition salts, the alkyl quaternary ammonium salts wherein the alkyl has not more than 18 carbon atoms, and the N-oxides thereof.

2. 1-(chloromethylsulfonyl)-4-methylpiperazine.
3. 1 - (chloromethylsulfonyl)hexahydro-4-methyl-1,4-diazepine.
4. 1 - (chloromethylsulfonyl)octahydro-5-methyl-1,5-diazocine.
5. 1 - (chloromethylsulfonyl)-4-methylpiperazine hydrochloride.
6. 1 - (chloromethylsulfonyl)hexahydro-4-methyl-1,4-diazepine hydrochloride.
7. 1 - (chloromethylsulfonyl)octahydro-5-methyl-1,5-diazocine hydrochloride.
8. A compound of Formula I wherein $m$ and $n$ are integers of from 2 to 3 and R is a hydrocarbon radical of not more than 10 carbon atoms selected from the group consisting of alkyl, cycloalkyl, aralkyl, and aryl.
9. A compound of Formula I wherein $m$ and $n$ are integers of from 2 to 3 and R is alkyl of not more than 10 carbon atoms.
10. A compound of Formula I wherein $m$ and $n$ are integers of from 2 to 3 and R is methyl.

References Cited by the Examiner

UNITED STATES PATENTS

| | | | |
|---|---|---|---|
| 2,507,408 | 5/50 | Jacob | 260—268 |
| 3,041,341 | 6/62 | Barrett et al. | 260—268 |
| 3,098,066 | 7/63 | Mull | 260—239 |

OTHER REFERENCES

Burger: Medicinal Chemistry (New York, 1960), pages 81, 43, and 1055.

Culvenor: Rev. Pure App. Chem., vol. 3, pages 83–114 (1953).

NICHOLAS S. RIZZO, *Primary Examiner.*